United States Patent
Niemczyk

(10) Patent No.: US 12,527,266 B2
(45) Date of Patent: Jan. 20, 2026

(54) SUSTAINABLE AGRICULTURE PASSIVE SYSTEM

(71) Applicant: Andrew Niemczyk, Hazel Park, MI (US)

(72) Inventor: Andrew Niemczyk, Hazel Park, MI (US)

( * ) Notice: Subject to any disclaimer, the term of this patent is extended or adjusted under 35 U.S.C. 154(b) by 0 days.

(21) Appl. No.: 18/752,930

(22) Filed: Jun. 25, 2024

(65) Prior Publication Data

US 2025/0024797 A1    Jan. 23, 2025

Related U.S. Application Data

(60) Provisional application No. 63/527,924, filed on Jul. 20, 2023.

(51) Int. Cl.
*A01G 29/00* (2006.01)

(52) U.S. Cl.
CPC .................................... *A01G 29/00* (2013.01)

(58) Field of Classification Search
CPC .......... A01G 29/00; E02B 11/00; A01B 45/02
See application file for complete search history.

(56) References Cited

U.S. PATENT DOCUMENTS

| | | | |
|---|---|---|---|
| 10,736,252 B2 * | 8/2020 | Niemczyk | A01B 45/02 |
| 2008/0005960 A1 | 1/2008 | King | |
| 2011/0064521 A1 | 3/2011 | Schafer | |
| 2019/0208721 A1 * | 7/2019 | Niemczyk | A01G 29/00 |
| 2022/0310280 A1 | 9/2022 | Niemczyk | |

FOREIGN PATENT DOCUMENTS

| | | | |
|---|---|---|---|
| KR | 1020110114438 A | 10/2011 | |
| KR | 102310818 B1 | 10/2021 | |

OTHER PUBLICATIONS

Int'l Search Report for PCT/US2024/038956, dated Nov. 7, 2024.

* cited by examiner

*Primary Examiner* — Joshua J Michener
*Assistant Examiner* — Henry Hooper Mudd
(74) *Attorney, Agent, or Firm* — MaxGoLaw PLLC

(57) ABSTRACT

An agricultural nutrient supply device includes a profile and cap. The profile defines chambers that extends along a longitudinal axis of the profile from the first end to the second end of the profile. The cap engages with an end of the profile. The cap includes an exterior wall open at a first end and defining a dome at a second end of the cap. The exterior wall defines open channels that extend from the first end of the cap to a chamber defined by the dome. Several agricultural nutrient supply devices are configured to be installed in the soil of an agricultural farming field as a sustainable agriculture passive system. The system is installed in the agricultural farming field, the devices access nutrients deep in the soil and passively supply those nutrients to crops planted at the surface of the field thereby reducing required fertilizer or tilling.

25 Claims, 6 Drawing Sheets

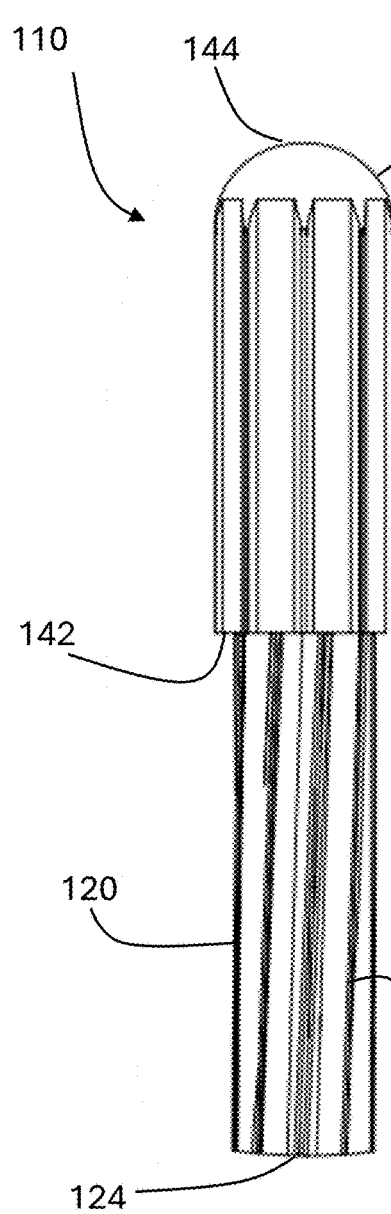
FIG. 1
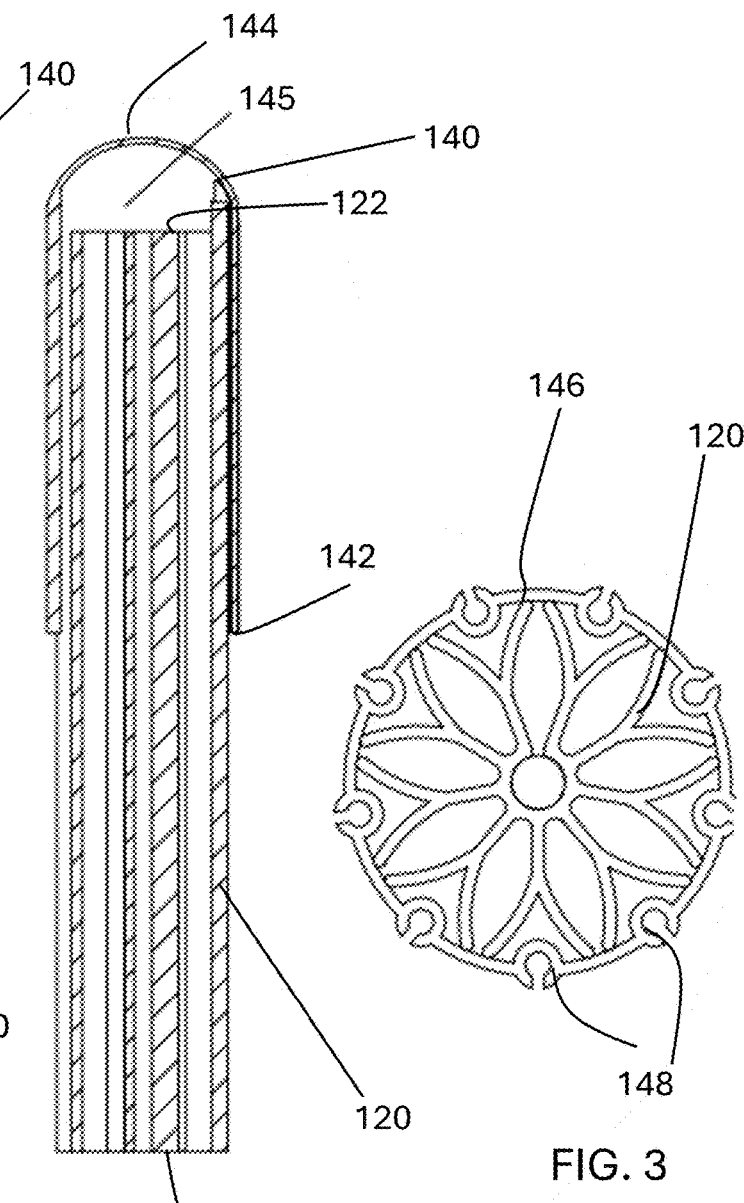
FIG. 2
FIG. 3

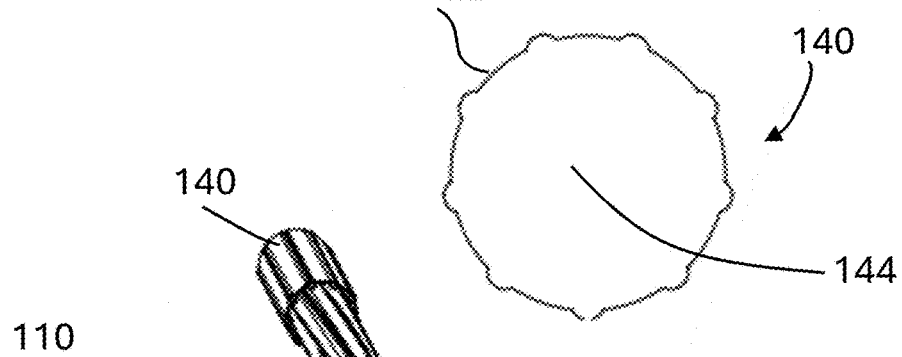
FIG. 8
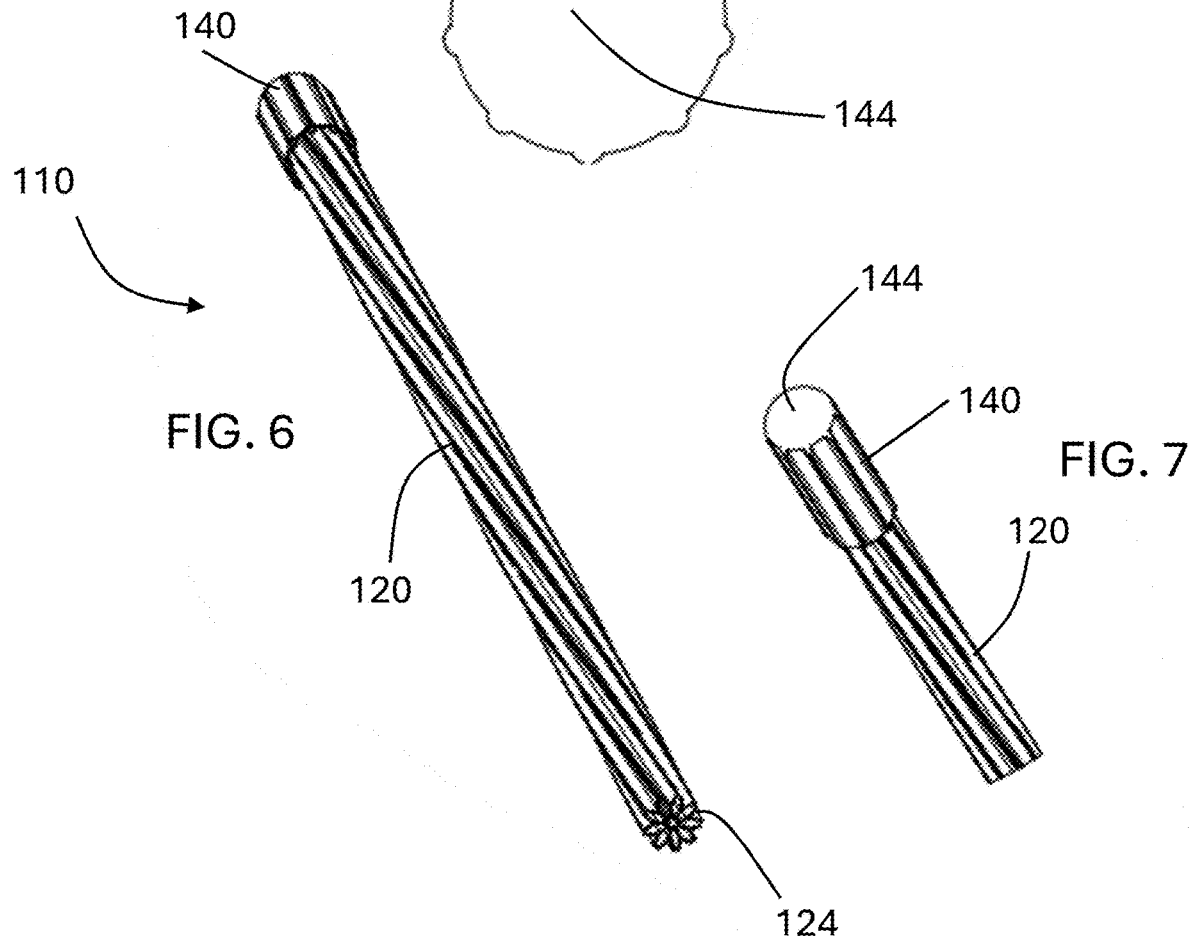
FIG. 6
FIG. 7
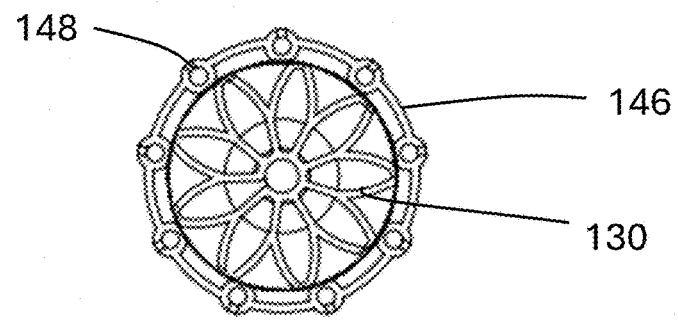
FIG. 9

SUSTAINABLE AGRICULTURE PASSIVE SYSTEM

RELATED APPLICATION DATA

This application claims priority U.S. Provisional Application No. 63/527,924, filed Jul. 20, 2023, the entire disclosure of which is hereby incorporated by reference as if set forth fully herein.

FIELD OF THE INVENTION

The present invention relates in general to a sustainable agriculture passive system, and in particular to a system of profiles and caps for accessing nutrients deep in soil and passively providing those nutrients to crops planted at the surface of the soil of agricultural farming fields in order to reduce or eliminate the need for fertilizer, crop rotations, and/or required tilling operations in order to grow crops.

BACKGROUND OF THE INVENTION

It is well known that plants require various nutrients to grow and thrive, including nitrogen, phosphorus, and potassium, as well as other nutrients like iron, zinc, and manganese. The amount of nutrition needed by vegetation varies depending on many factors including the type of plant, its growth stage, environmental factors, etc. Nutrients for plants are typically obtained from the soil, water, and air, with sunlight and water also being essential for photosynthesis.

In agriculture and farming, to ensure healthy plant growth, it is important to provide the necessary nutrients in appropriate quantities to crops. This can be done through various means, such as using said fertilizers, compost, or organic matter to enrich the soil. Additionally, proper irrigation and sunlight exposure are vital for optimal plant nutrition. Excessive or insufficient amounts of nutrients can have negative effects on the growth of crops. Over-fertilization, for example, can lead to nutrient imbalances, environmental pollution, and harm to plants.

Nutrients travel through the soil to reach the plant roots through a process called nutrient uptake. Nutrient uptake involves several mechanisms that allow nutrients to move from the soil to the roots where they are absorbed by the plants. These mechanisms include dissolution, diffusion, mass flow, root interception, active transport, and translocation. Dissolution involves the dissolving of nutrients that are present in the form of minerals or organic matter within the soil with water, creating a water nutrient solution. Diffusion involves the movement of the water nutrient solution from areas of higher concentration to areas of lower concentration to disperse the water nutrient solution in the soil and gradually move towards the root surface of the plants in the soil. Mass flow involves the way the nutrients dissolved in the water within the soil are carried with the water as the water moves through the soil to be taken up by roots of the plants. Root interception involves plant roots have specialized structures like root hairs that increase the surface area available for nutrient absorption and as the roots grow and extend through soil to come into contact with the nutrient rich water nutrient solution the nutrients in the water nutrient solution are absorbed into the roots. Active transport involves the way that nutrients absorbed by the root surfaces are absorbed into the root cells, allowing plants to selectively take up specific nutrients they require for growth and development. Translocation involves the way that nutrients absorbed by the root cells are transported up through xylem vessels in the plants to carry water and dissolved nutrients from the roots to the rest of the plant, including the stems, leaves, and other plant organs.

The availability of nutrients in the soil can be influenced by various factors such as pH, organic matter content, microbial activity, and the presence of competing plants of microorganisms. Soil management practices, such as proper fertilization, pH adjustment, and the extent of organic matter, can help enhance nutrient availability and uptake by plants; however, it is estimated that around 90% of the roots of most plants are within the top two feet of the soil. This is the zone where plants primarily extract nutrients. Deeper down, nutrients within the soil are simply not available to the planted crops given that roots do not typically extend so deep given the length of available time in a natural growing season.

Given that the vast majority of nutrients for crops are typically coming from the top three feet of soil depth, this region of the soil can quickly become depleted of vital nutrients. As a result, fertilizers applied to the soil surface are needed. Application of fertilizer to the surface of a planting area substantially increases the cost and difficulty of producing crops, making growing food impractical in certain regions due to the need for spreading excessive quantities of fertilizer. Similarly, required crop rotation and tilling operations caused by the nutrient depletion within the top three feet of a planting field increase the cost associated with farming. Additionally, from an environmental standpoint, the introduction of fertilizers raises several ecological concerns including the potential to cause algae blooms in surface waters, pathogens and nitrates in drinking water, and the emission of odors and gases into the air that contribute to greenhouse gases.

Thus, there exists a need for a system capable of accessing nutrients deeper down in the soil of agricultural farming fields in order to reduce or eliminate the need for fertilizer, crop rotations, and/or required tilling operations in order to grow crops.

SUMMARY OF THIS INVENTION

The present invention provides an agricultural nutrient supply device that includes a profile and a cap. The profile has a circular wall defining a central channel that extends along a longitudinal axis of the profile and a plurality of wall members each having a first end connected to an exterior of the circular wall and a second free end. The plurality of wall members radially extending from the exterior of the circular wall about a circumference of the circular wall. The plurality of wall members extend from the first end to the second end of the profile and define a plurality of chambers between the plurality of wall members. The chambers extend from the first end to the second end of the profile. The cap is configured to engage with one of the ends of the profile. The cap includes an exterior circular wall open at the first end of the cap and defining a dome at the second end of the cap. The exterior circular wall additionally defines a plurality of open channels that extend from a first end of the cap to a chamber defined by the dome at the second end of the cap.

A plurality of agricultural nutrient supply devices are configured to be installed in the soil of an agricultural farming field as a sustainable agriculture passive system. When the sustainable agriculture passive system is installed in the agricultural farming field, the agricultural nutrient supply devices access nutrients deep in the soil and passively supply those nutrients to crops planted at the surface of the field via the chambers of the profiles. The nutrients pass via the chambers and accumulate in the chamber defined by the dome at the second end of the cap. Then the nutrients travel down the open channels defined in the exterior circular wall of the cap in order to be dispersed into the soil at a depth closer to the surface A of the field in a region where the roots of the crops are able to access the nutrients. The area in which the nutrients disperse grows larger over time, for example the course to 2 to 3 years, after which, the need to provide fertilizer or tilling operations is greatly reduced or completely eliminated.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a side view of an agricultural nutrient supply device having a cap of the device engaged with a profile of the device according to embodiments of the present invention;

FIG. 2 is a cross sectional view of the agricultural nutrient supply device of FIG. 1;

FIG. 3 is a cross sectional view of the agricultural nutrient supply device of FIG. 1 cut through the cap and profile and looking toward the second end of the profile;

FIG. 6 is a perspective view an agricultural nutrient supply device having a cap of the device engaged with a profile of the device according to embodiments of the present invention;

FIG. 7 is a top perspective view an agricultural nutrient supply device having a cap of the device engaged with a profile of the device according to embodiments of the present invention;

FIG. 8 is a top view of a cap of an agricultural nutrient supply device according to embodiments of the present invention;

FIG. 9 is a cross sectional view of the agricultural nutrient supply device of FIG. 1 cut through the cap and profile and looking toward the second end of the cap;

DESCRIPTION OF THE INVENTION

Figure 4:
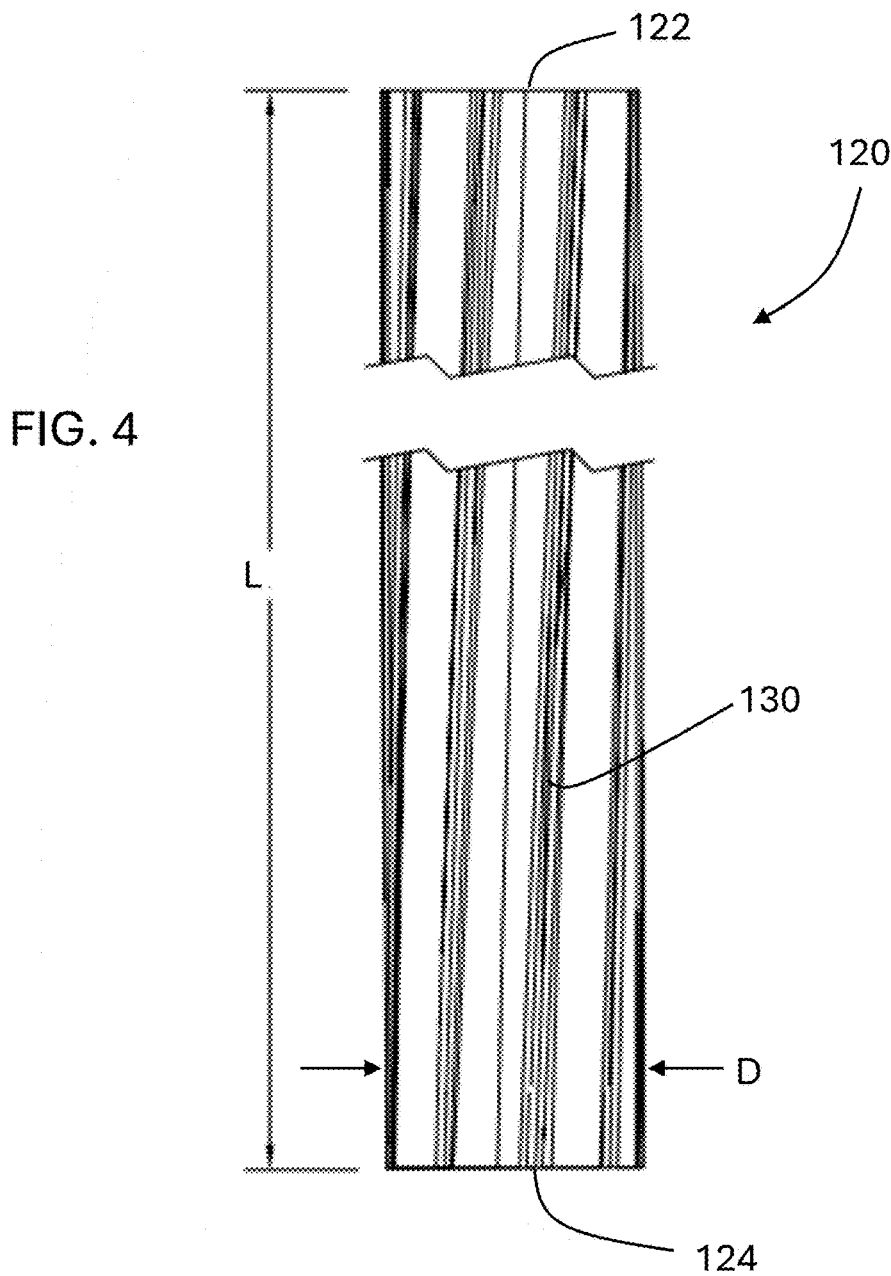
FIG. 4 is a side view of the profile of the agricultural nutrient supply device according to embodiments of the present invention.

The present invention has utility as a sustainable agriculture passive system including a plurality of profiles and caps for accessing nutrients deep in soil and passively providing those nutrients to crops planted at the surface of the soil of agricultural farming fields in order to reduce or eliminate the need for fertilizer, crop rotations, and/or required tilling operations in order to grow crops.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to certain inventive embodiments and with reference to FIGS. 1-12, a sustainable agriculture passive system 100 for accessing nutrients deep in soil and passively providing those nutrients to crops C planted at the surface A of the soil S of agricultural farming fields in order to reduce or eliminate the need for fertilizer, crop rotations, and/or required tilling operations in order to grow crops includes a plurality of agricultural nutrient supply devices 110 that each include a profile 120 and a corresponding cap 140.

According to embodiments, the profile 120 of each agricultural nutrient supply device 110 has a first end 122 and a second end 124 and a longitudinal axis extending therebetween. The profile 120 additionally includes a circular wall 126 and a plurality of wall members 130. The circular wall 126 defines a central channel 128 therein that extends along the longitudinal axis from the first end 122 of the profile 120 to the second end 124 of the profile 120. According to embodiments, the circular wall 126 defines a gap 127 therein that extends longitudinally from the first end 122 of the profile 120 to the second end 124 of the profile 120. This gap 127 provides some flexibility to the profile 120, allowing the outer diameter of the profile 120 to become slightly smaller when squeezed, for example by the cap 140.

Figure 5:
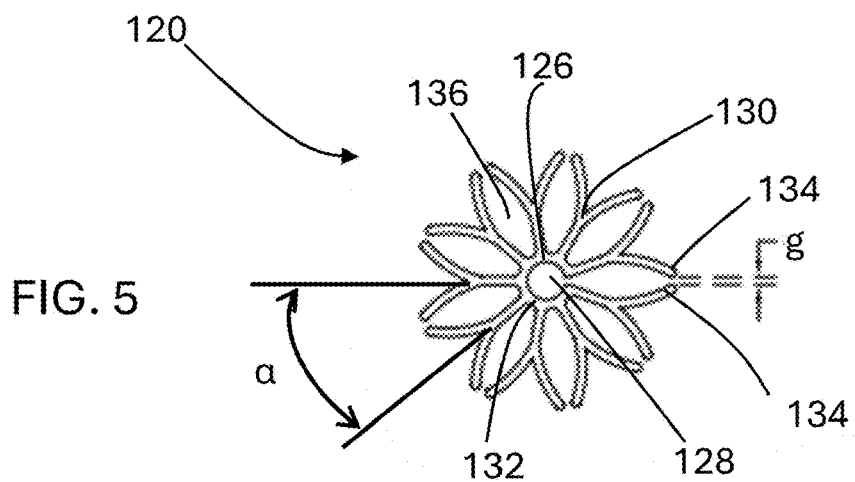
FIG. 5 is a cross sectional view of the profile of the agricultural nutrient supply device according to embodiments of the present invention.
Figure 10:
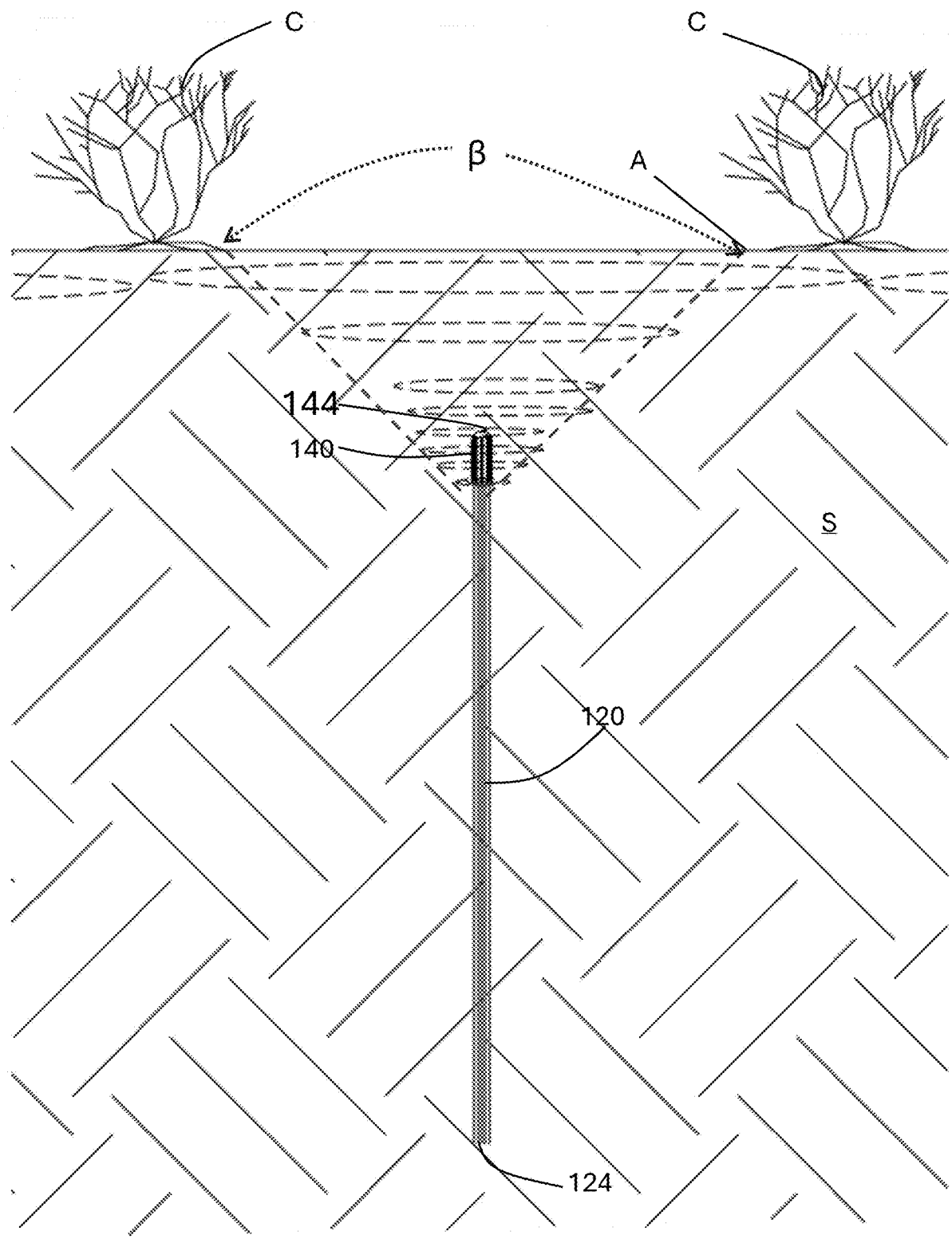
FIG. 10 is a side view of an agricultural nutrient supply device installed in an agricultural farming field according to embodiments of the present invention.
Figure 11:
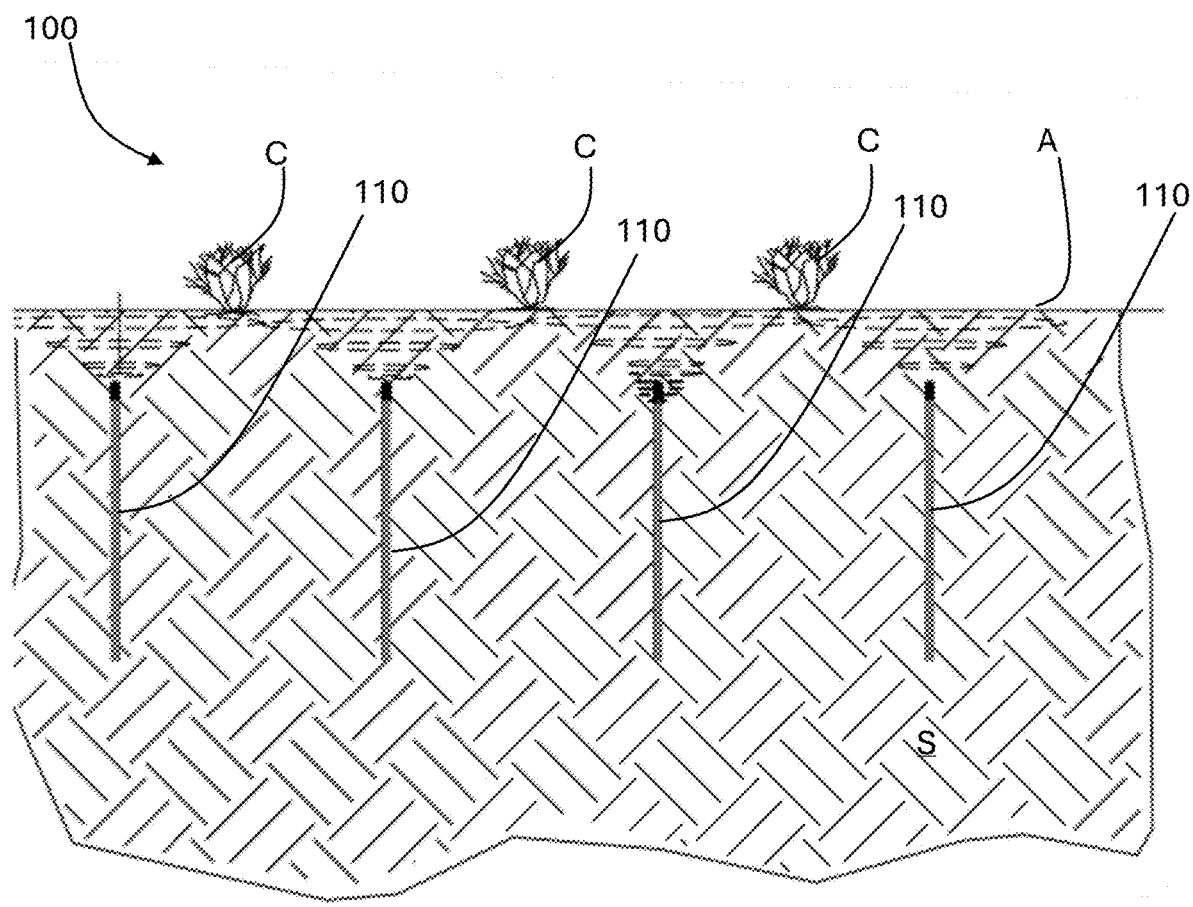
FIG. 11 is a side view of a sustainable agriculture passive system including several agricultural nutrient supply devices installed in an agricultural farming field according to embodiments of the present invention.

The plurality of wall members 130 each have a first end 132 and a second end 134. The first end 132 of each wall member 130 is connected to an exterior of the circular wall 126 while the second end 134 of each of the plurality of wall members 130 is free. The plurality of wall members 130 radially extend from the exterior of the circular wall 126 about a circumference of the circular wall 126. The plurality of wall members 130 extend along the length of the profile 120 from the first end 122 of the profile 120 to the second end 124 of the profile 120. According to embodiments, the wall member 130 are Y-shaped, giving each wall member 130 two second ends 134. According to embodiments, the wall members 130 include 3 to 24 wall members 130 per profile 120. According to embodiments, the first end 132 of each of the plurality of wall members 130 of the profile 120 is separated from the adjacent wall member 130 of the plurality of wall members 130 of the profile by an angle α as shown in FIG. 5, which according to some embodiments is 20 to 60 degrees. According to embodiments, the second end 134 of each of the plurality of wall members 130 of the profile 120 is spaced apart from the second end 134 of the adjacent wall 130 member of the plurality of wall members 130 of the profile 120 by a gap g as best shown in FIG. 5, which according to embodiments is 0.025 to 0.075 inches. According to embodiments, and as shown in FIG. 4, the plurality of wall members 130 of the profile 120 twist around the circular wall 126 of the profile 120 as they extend from the first end 122 of the profile 120 to the second end 124 of the profile 120. According to some embodiments, the period of the twist is 1 to 5 feet.

The plurality of wall members 130 define a plurality of chambers 136 between the plurality of wall members 130. The chambers 136 extend the length of the profile 120 from the first end 122 of the profile 120 to the second end 124 of the profile 120. It will be understood that if the wall members 130 twist around the profile 120, the chambers 136 also twist around the profile 120 with the same period.

The cap 140 is configured to slidably engage with one of the first end 122 of the profile 120 or the second end 124 of the profile 120. The cap 140 of the agricultural nutrient supply device 110 has a first end 142 and a second end 144 and a longitudinal axis extending therebetween. The cap 140 includes an exterior circular wall 146 open at the first end 142 of the cap 140 and defining a dome at the second end 144 of the cap 140, as shown in FIG. 2. The exterior circular wall 146 additionally defines a plurality of open channels 148 that extend from a first end 142 of the cap 140 to a chamber 145 defined by the dome at the second end 144 of the cap 140. According to embodiments, the plurality of open channels 148 defined in the exterior circular wall 146 of the cap 140 are C-shaped. According to embodiments, the plurality of open channels 148 defined in the exterior circular wall 146 of the cap 140 are open at an exterior side of the cap 140. According to embodiments, the plurality of open channels 148 defined in the exterior circular wall 146 of the cap 140 are present in a 1:1 ratio with the plurality of wall members 130 of the profile 120.

According to embodiments, the profile 120 has a length L from the first end 122 of the profile 120 to the second end 124 of the profile 120 that is 3 to 5 feet long. According to embodiments, the profile 120 has an outer diameter D of 2 to 6 inches. According to embodiments, the cap 140 has a length from the first end 142 of the cap 140 to the second end 144 of the cap 140 that is 3 to 6 inches long. According to embodiments, the cap 140 has an outer diameter that is 0.25 to 0.75 inches larger than an outer of the profile 120.

According to embodiments, the profile 120 and/or the cap 140 are formed of any plastic material, such as Polyethylene (LDPE or HDPE), Terephthalate (PET or PETE), Polyvinyl Chloride (PVC or Vinyl), Polypropylene (PP), or Polystyrene (PS). According to embodiments, the profile 120 and cap 140 are preferably formed of polyethylene. According to embodiments, the profile 120 and/or the cap 140 are formed by an extrusion process. According to embodiments, the profile 120 and/or the cap 140 are formed by an additive printing process.

According to embodiments, a plurality of agricultural nutrient supply devices 110 are configured to be installed in the soil S of an agricultural farming field as a sustainable agriculture passive system 100. To install the system 100, several holes are dug into the soil S of the field. Next, the caps 140 are engaged with one of the ends of the profile 120, for example with the first end 122 of the profile. The profiles 120 with the caps 140 engaged are then installed vertically in the holes in the soil S of an agricultural farming field, such that the caps 140 are positioned closest to the surface A of the soil S. Next, any remaining hole above the devices 110 is filled with soil S, such as that native soil excavated by digging of the holes. It is appreciated that other types of fill are used as soil S. These other fills illustratively include topsoil, biochar, soil amendments, fertilizers, and combinations thereof. According to embodiments, the plurality of agricultural nutrient supply devices 110 are configured to be installed such that the second end 144 of each of the plurality of caps 140 is 0 to 24 inches below a surface A of the agricultural farming field. Installing the devices 110 at a depth below the surface A of the field allows for typical tilling operations to be undertaken; however, embodiment of the present invention alleviate the need for such tilling operations, thereby enabling the installation of the devices such that the second end 144 of the caps 140 of the devices at the surface A. According to embodiments, the plurality of agricultural nutrient supply devices 110 are configured to be spaced apart by 3 to 10 feet throughout the agricultural farming field.

Figure 12:
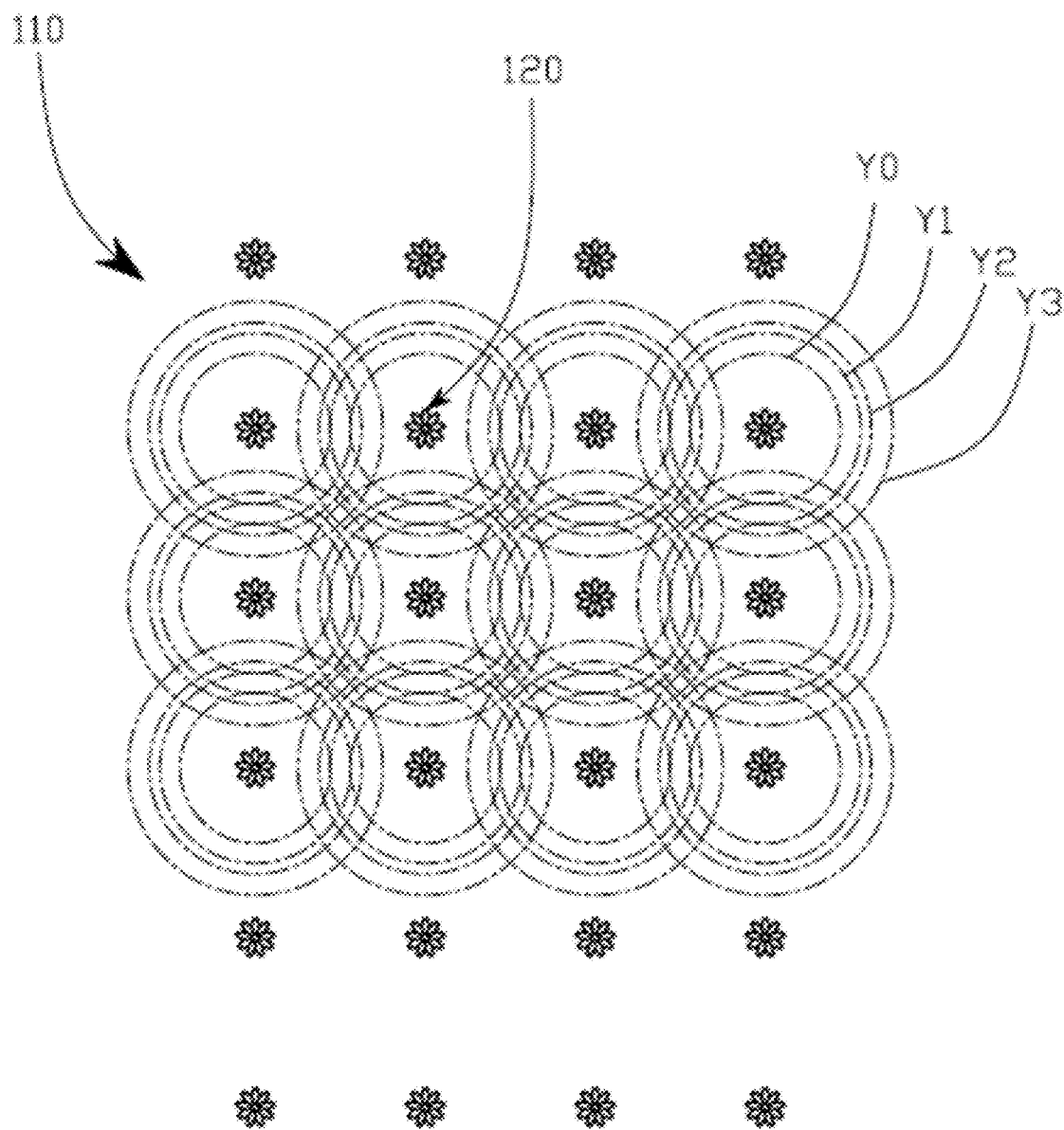
FIG. 12 is a top view of a sustainable agriculture passive system including several agricultural nutrient supply devices installed in an agricultural farming field according to embodiments of the present invention.

When the sustainable agriculture passive system 100 is installed in the agricultural farming field, the agricultural nutrient supply devices 110 access nutrients deep in the soil and passively supplies those nutrients to crops C planted at the surface A of the field via the chambers 136 of the profiles 120. The nutrients pass via the chambers 136 and accumulate in the chamber 145 defined by the dome at the second end 144 of the cap 140. Then the nutrients travel up the open channels 148 defined in the exterior circular wall 146 of the cap 140 in order to be dispersed into the soil at a depth closer to the surface A of the field in a region where the roots of the crops C are able to access the bloom of nutrients. As shown in FIG. 12, the area in which the nutrients disperse grows larger over time, for example over the course to 2 to 3 years. For visual clarity, the conical bloom of nutrients is only depicted for three rows of devices 120. While the devices depicted in a square close-packed pattern, devices are also readily deployed in patterns that include hexagonal, random close packed, random loose packed, pentagonal close packed, and combinations thereof. As shown in FIG. 12, the as installed nutrient spread, Y0, the first year nutrients spread is shown by dotted circle Y1, the second year nutrients spread is shown by dotted circle Y2, and the third year nutrients spread is shown by dotted circle Y3. After this time period for establishing the system 100, the need to provide fertilizer or tilling operations is completely eliminated as the interstitial regions between adjacent devices 110 are eliminated. The conical angles β of nutrient bloom are shown in cross-section and in overhead views, in FIGS. 10 and 12, respectively. The angle β in some inventive embodiments increases from an initial value at Y0, of for example, 30 to 60 degrees to for example, to 80 to 120 by Y3. It is appreciated that the kinetics of interstitial region elimination depends on factors that include device spacing, soil type, device dimensions, and field climate conditions.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. An agricultural nutrient supply device comprising:
   a profile having a first end and a second end and a longitudinal axis extending therebetween, the profile comprising:
   a circular wall defining a central channel therein extending along the longitudinal axis; and
   a plurality of wall members each having a first end connected to an exterior of the circular wall and a second free end, the plurality of wall members radially extending from the exterior of the circular wall about a circumference of the circular wall, the plurality of wall members extending from the first end to the second end of the profile and defining a plurality of chambers between the plurality of wall members, the chambers extending from the first end to the second end of the profile, the plurality of wall members of the profile twisting around the circular wall of the profile as they extend from the first end of the profile to the second end of the profile; and
   a cap having a first end and a second end and a longitudinal axis extending therebetween, the cap configured to engage with one of the first end of the profile or the second end of the profile, the cap comprising:
   an exterior circular wall open at the first end of the cap and defining a dome at the second end of the cap, the exterior circular wall additionally defining a plurality of open channels that extend from a first end of the cap to a chamber defined by the dome at the second end of the cap.

2. The agricultural nutrient supply device of claim 1 wherein the profile is formed of polyethylene.

3. The agricultural nutrient supply device of claim 1 wherein the profile has a length from the first end of the profile to the second end of the profile that is 3 to 5 feet long.

4. The agricultural nutrient supply device of claim 1 wherein the profile has an outer diameter of 2 to 6 inches.

5. The agricultural nutrient supply device of claim 1 wherein the circular wall of the profile defines a gap therein that extends longitudinally from the first end of the profile to the second end of the profile.

6. The agricultural nutrient supply device of claim 1 wherein the first end of each of the plurality of wall members of the profile is separated from an adjacent wall member of the plurality of wall members of the profile by an angle of 20 to 60 degrees.

7. The agricultural nutrient supply device of claim 1 wherein the second end of each of the plurality of wall members of the profile is spaced apart from an adjacent wall member of the plurality of wall members of the profile by a gap of 0.025 to 0.075 inches.

8. The agricultural nutrient supply device of claim 1 wherein each of the plurality of wall members of the profile is Y-shaped.

9. The agricultural nutrient supply device of claim 1 wherein the period of the twist is 1 to 5 feet.

10. The agricultural nutrient supply device of claim 1 wherein the plurality of wall members of the profile includes 3 to 24 wall members.

11. The agricultural nutrient supply device of claim 1 wherein the cap has a length from the first end of the cap to the second end of the cap that is 3 to 6 inches long.

12. The agricultural nutrient supply device of claim 1 wherein the cap has an outer diameter that is 0.25 to 0.75 inches larger than an outer of the profile.

13. The agricultural nutrient supply device of claim 1 wherein the cap is formed of polyethylene.

14. The agricultural nutrient supply device of claim 1 wherein the plurality of open channels defined in the exterior circular wall of the cap are C-shaped.

15. The agricultural nutrient supply device of claim 1 wherein the plurality of open channels defined in the exterior circular wall of the cap are open at an exterior side of the cap.

16. The agricultural nutrient supply device of claim 1 wherein the plurality of open channels defined in the exterior circular wall of the cap are present in a 1:1 ratio with the plurality of wall members of the profile.

17. A sustainable agriculture passive system comprising:
    a plurality of agricultural nutrient supply devices of claim 1 configured to be installed vertically in soil of an agricultural farming field with the cap of each of the plurality of agricultural nutrient supply devices engaged with the first end of each of the plurality of profiles.

18. The sustainable agriculture passive system of claim 17 wherein the plurality of agricultural nutrient supply devices are configured to be installed such that the second end of each of the plurality of caps is 0 to 24 inches below a surface of the agricultural farming field.

19. A method of passive supply of agricultural nutrients to crops growing in a field comprising:
    deploying the system of claim 17; and
    allowing sufficient time for the agricultural nutrients to bloom upward through the soil to the crops growing in the field.

20. An agricultural nutrient supply device comprising:
    a profile having a first end and a second end and a longitudinal axis extending therebetween, the profile comprising:
    a circular wall defining a central channel therein extending along the longitudinal axis; and
    a plurality of wall members each having a first end connected to an exterior of the circular wall and a second free end, the plurality of wall members radially extending from the exterior of the circular wall about a circumference of the circular wall, each of the plurality of wall members separated from an adjacent wall member of the plurality of wall members by an angle alpha of 20 to 40 degrees, the plurality of wall members extending from the first end to the second end of the profile and defining a plurality of chambers between the plurality of wall members, the chambers extending from the first end to the second end of the profile, the wall members being Y-shaped; and a cap having a first end and a second end and a longitudinal axis extending therebetween, the cap configured to engage with one of the first end of the profile or the second end of the profile, the cap comprising:

an exterior circular wall open at the first end of the cap and defining a dome at the second end of the cap, the exterior circular wall additionally defining a plurality of open channels that extend from a first end of the cap to a chamber defined by the dome at the second end of the cap.

21. The agricultural nutrient supply device of claim 20 wherein the profile has a length from the first end of the profile to the second end of the profile that is 3 to 5 feet long.

22. The agricultural nutrient supply device of claim 20 wherein the profile has an outer diameter of 2 to 6 inches.

23. The agricultural nutrient supply device of claim 20 wherein the circular wall of the profile defines a gap therein that extends longitudinally from the first end of the profile to the second end of the profile.

24. The agricultural nutrient supply device of claim 20 wherein the second end of each of the plurality of wall members of the profile is spaced apart from an adjacent wall member of the plurality of wall members of the profile by a gap of 0.025 to 0.075 inches.

25. The agricultural nutrient supply device of claim 20 wherein the plurality of wall members of the profile includes 3 to 24 wall members.

* * * * *